US012174638B2

(12) United States Patent
Rajakumar et al.

(10) Patent No.: US 12,174,638 B2
(45) Date of Patent: Dec. 24, 2024

(54) SYSTEMS AND METHODS FOR OBSTACLE DETECTION

(71) Applicant: CNH Industrial America LLC, New Holland, PA (US)

(72) Inventors: Murali Rajakumar, Downer Grove, IL (US); Christopher Fedor, Apollo, PA (US); Hrudhansh Ubale, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 224 days.

(21) Appl. No.: 17/382,557

(22) Filed: Jul. 22, 2021

(65) Prior Publication Data
US 2023/0027496 A1    Jan. 26, 2023

(51) Int. Cl.
*G05D 1/00* (2024.01)
*G01S 15/931* (2020.01)
(Continued)

(52) U.S. Cl.
CPC .......... *G05D 1/0238* (2013.01); *G01S 15/931* (2013.01); *G05D 1/0038* (2013.01); *G05D 1/0055* (2013.01); *G06N 3/08* (2013.01); *G06T 7/194* (2017.01); *G06V 20/58* (2022.01); *G06T 2207/20084* (2013.01); *G06T 2207/30261* (2013.01)

(58) Field of Classification Search
CPC .. G05D 1/0238; G05D 1/0038; G05D 1/0055; G05D 2201/0201; G01S 15/931; G01S 15/89; G01S 17/931; G06N 3/08; G06T 7/194; G06T 2207/20084; G06T 2207/30261; G06V 20/58
See application file for complete search history.

(56) References Cited

U.S. PATENT DOCUMENTS 10,292,321 B2    5/2019  Neitemeier et al.
10,788,835 B2    9/2020  Hurd et al.
(Continued)

FOREIGN PATENT DOCUMENTS

WO    WO-2019/187937    10/2019

OTHER PUBLICATIONS

Lindhorst, Caleb, "Field Obstacle Identification for Autonomous Tractor Applications" (2019) Biological System Engineering—Dissertations, Theses, and Student Research. 373 pages.

*Primary Examiner* — Ig T An
(74) *Attorney, Agent, or Firm* — Rickard K. DeMille; Rebecca L. Henkel; Peter K. Zacharias

(57) ABSTRACT

A vehicle control system for an agricultural vehicle including a processing circuit including a processor and memory, the memory having instructions stored thereon that, when executed by the processor, cause the processing circuit to receive (i) image data depicting at least a portion of a hazard area associated with the agricultural vehicle and (ii) ultrasonic sensor data from an ultrasonic sensor monitoring the hazard area, determine, based on a combination of the image data and the ultrasonic sensor data, whether an obstacle is positioned at least partially within the hazard area, and perform an action with respect to the agricultural vehicle in response to a determination that the obstacle is positioned at least partially within the hazard area.

20 Claims, 8 Drawing Sheets

(51) Int. Cl.
*G06N 3/08* (2023.01)
*G06T 7/194* (2017.01)
*G06V 20/58* (2022.01)

(56) References Cited

U.S. PATENT DOCUMENTS

| | | | |
|---|---|---|---|
| 2019/0332118 A1* | 10/2019 | Wang | G05D 1/0238 |
| 2021/0018617 A1 | 1/2021 | Iwase et al. | |
| 2021/0024062 A1 | 1/2021 | Schott et al. | |
| 2021/0100156 A1 | 4/2021 | Iwase et al. | |
| 2021/0164194 A1* | 6/2021 | Nishi | E02F 9/2004 |
| 2022/0126864 A1* | 4/2022 | Moustafa | G06T 1/0007 |
| 2022/0230444 A1* | 7/2022 | Edo | A01D 41/127 |
| 2022/0261593 A1* | 8/2022 | Yu | G06N 3/088 |
| 2022/0397897 A1* | 12/2022 | Pandita | E02F 9/262 |

\* cited by examiner

SYSTEMS AND METHODS FOR OBSTACLE DETECTION

BACKGROUND

The present disclosure relates generally to the field of vehicle operation, and more particularly to systems and methods for performing obstacle detection to prevent injury on vehicles such as farm equipment.

SUMMARY

One embodiment of the present disclosure is a vehicle control system for an agricultural vehicle including a processing circuit including a processor and memory, the memory having instructions stored thereon that, when executed by the processor, cause the processing circuit to receive (i) image data depicting at least a portion of a hazard area associated with the agricultural vehicle and (ii) ultrasonic sensor data from an ultrasonic sensor monitoring the hazard area, determine, based on a combination of the image data and the ultrasonic sensor data, whether an obstacle is positioned at least partially within the hazard area, and perform an action with respect to the agricultural vehicle in response to a determination that the obstacle is positioned at least partially within the hazard area.

In some embodiments, determining whether the obstacle is positioned at least partially within the hazard area includes performing background subtraction using the image data and a background model. In some embodiments, performing background subtraction using the image data includes labeling one or more pixels of the image data as foreground pixels and one or more pixels of the image data as background pixels. In some embodiments, determining whether the obstacle is positioned at least partially within the hazard area includes executing a machine learning model using the image data to identify an object in the image data. In some embodiments, determining whether the obstacle is positioned at least partially within the hazard area further includes determining a position of the object in the image data using the ultrasonic sensor data. In some embodiments, the instructions further cause the processing circuit to receive a signal to remotely start the agricultural vehicle, and wherein performing the action includes transmitting an image showing the obstacle positioned at least partially within the hazard area. In some embodiments, the instructions further cause the processing circuit to receive a signal to remotely start the agricultural vehicle, and wherein performing the action includes preventing the agricultural vehicle from starting.

Another embodiment of the present disclosure is a method for controlling an agricultural vehicle including receiving (i) image data depicting at least a portion of a hazard area associated with the agricultural vehicle and (ii) ultrasonic sensor data from an ultrasonic sensor monitoring the hazard area, determining, based on a combination of the image data and the ultrasonic sensor data, whether an obstacle is positioned at least partially within the hazard area, and performing an action with respect to the agricultural vehicle in response to a determination that the obstacle is positioned at least partially within the hazard area.

In some embodiments, determining whether the obstacle is positioned at least partially within the hazard area includes performing background subtraction using the image data and a background model. In some embodiments, performing background subtraction using the image data includes labeling one or more pixels of the image data as foreground pixels and one or more pixels of the image data as background pixels. In some embodiments, determining whether the obstacle is positioned at least partially within the hazard area includes executing a machine learning model using the image data to identify an object in the image data. In some embodiments, determining whether the obstacle is positioned at least partially within the hazard area further includes determining a position of the object in the image data using the ultrasonic sensor data. In some embodiments, the method comprises receiving a signal to remotely start the agricultural vehicle, and wherein performing the action includes transmitting an image showing the obstacle positioned at least partially within the hazard area. In some embodiments, the method comprises receiving a signal to remotely start the agricultural vehicle, and wherein performing the action includes preventing the agricultural vehicle from starting.

Another embodiment of the present disclosure is a non-transitory computer-readable storage medium having instructions stored thereon that, when executed by one or more processors, cause the one or more processors to receive (i) image data depicting at least a portion of a hazard area associated with an agricultural vehicle and (ii) ultrasonic sensor data from an ultrasonic sensor monitoring the hazard area, determine, based on a combination of the image data and the ultrasonic sensor data, whether an obstacle is positioned at least partially within the hazard area, and perform an action with respect to the agricultural vehicle in response to a determination that the obstacle is positioned at least partially within the hazard area, wherein the action includes preventing the agricultural vehicle from starting.

In some embodiments, determining whether the obstacle is positioned at least partially within the hazard area includes performing background subtraction using the image data and a background model. In some embodiments, performing background subtraction using the image data includes labeling one or more pixels of the image data as foreground pixels and one or more pixels of the image data as background pixels. In some embodiments, determining whether the obstacle is positioned at least partially within the hazard area includes executing a machine learning model using the image data to identify an object in the image data. In some embodiments, determining whether the obstacle is positioned at least partially within the hazard area further includes determining a position of the object in the image data using the ultrasonic sensor data. In some embodiments, the instructions further cause the one or more processors to receive a signal to remotely start the agricultural vehicle, and wherein performing the action includes transmitting an image showing the obstacle positioned at least partially within the hazard area.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
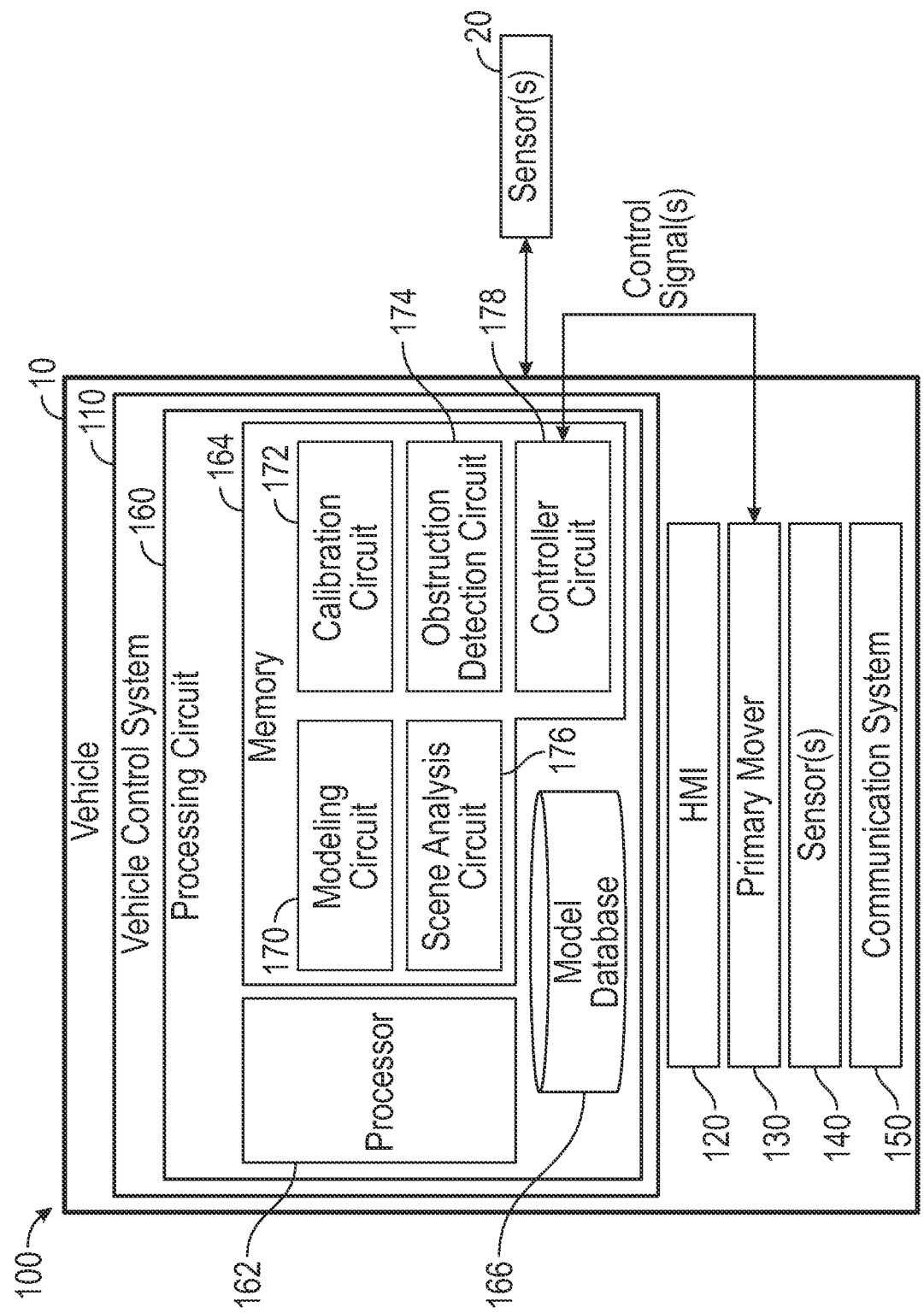
FIG. 1 is a block diagram of a vehicle having a vehicle control system, according to an exemplary embodiment.

Referring generally to the FIGURES, described herein are systems and methods of controlling vehicles such as agricultural or construction vehicles. In various embodiments, the vehicle control system detects the absence of obstacles in an image. Additionally or alternatively, the vehicle control system may detect one or more obstacles in a vicinity of the vehicle such as around hazard areas or pinch-points of the vehicle. For example, the vehicle control system may combine image data from a camera with position data from a three-dimensional (3D) ultrasonic sensor to identify obstacles (or a lack thereof) such as a human in a hazard area (e.g., under the vehicle) before a remote start operation of the vehicle. In various embodiments, the vehicle control system receives input from one or more sources. For example, the vehicle control system may receive image data (e.g., one or more images, a mosaic, etc.) from one or more cameras, proximity data from one or more ultrasonic sensors, and/or position/orientation data from one or more implements (e.g., a grain cart attached to the vehicle, etc.). In some embodiments, one or more sensors such as cameras are positioned on the vehicle. Additionally or alternatively, the vehicle control system may receive data from one or more sensors positioned elsewhere such as on a drone, a nearby telephone pole, or an implement coupled to the vehicle. In various embodiments, the vehicle control system controls the operation of a vehicle to avoid obstacles and/or alert an operator to obstacles. For example, the vehicle control system may control a remotely operated hauling vehicle to prevent the hauling vehicle from being remotely started (e.g., turned on, etc.) until after all obstacles have been cleared from hazard areas associated with the hauling vehicle. As another example, the vehicle control system may alert an operator to an obstacle that the vehicle control system determines is likely to enter a hazard area of the vehicle (e.g., a deer that runs into a path of the vehicle, etc.).

In various embodiments, the vehicle control system uses a combination of image data (e.g., from one or more cameras positioned on the vehicle, etc.) and additional sensor data, such as three-dimensional ultrasonic data, to identify obstacles and determine whether the obstacles are within (or are likely to enter) a hazard area of the vehicle. For example, the vehicle control system may receive a request to start a hauling vehicle (e.g., turn on an engine of the hauling vehicle, etc.), may query a number of nearby cameras to determine which cameras have a view of one or more of the hazard areas associated with the hauling vehicle (e.g., cameras mounted on the hauling vehicle, cameras mounted on nearby vehicles within view of the hauling vehicle, etc.), and may analyze image data from the cameras to determine whether an obstacle such as a human is within a hazard area of the hauling vehicle prior to starting the hauling vehicle. In various embodiments, the vehicle control system trains one or more machine learning models such as a convolutional neural network and/or a Siamese neural network to detect features and/or obstacles in image data. For example, the vehicle control system may train a machine learning model using initialization data (e.g., training images, etc.) and may use the trained model to detect obstacles (or a lack thereof) in a scene. As another example, the vehicle control system may dynamically update a model for detecting obstacles using feedback such as new image data or user input (e.g., a user indication that a scene is free of hazardous obstacles, etc.). In some embodiments, the vehicle control system trains the one or more machine learning models using a feedback loop. It should be understood that the vehicle control system may operate any vehicle, trailer, and/or implement. For example, the vehicle control system may operate an unloading auger of a grain cart to prevent the auger from turning on while an obstacle such as a human is positioned in a hazard area of the grain cart such as nearby a pickup feed of the unloading auger. In various embodiments, the vehicle control system of the present disclosure facilitates partial and/or complete automation of a vehicle and/or subsystems thereof. In various embodiments, the vehicle control system facilitates optimization (e.g., using top-down and bottom-up vision, etc.) to generate a close-proximity detection bubble/zone around an irregularly shaped vehicle. For example, the vehicle control system may combine images from a camera positioned on top of a vehicle with LIDAR data from a LIDAR unit positioned underneath the vehicle to detect obstacles within a protected zone (e.g., bubble, etc.) around the vehicle.

Hereinafter, example embodiments will be described in more detail with reference to the accompanying drawings. Referring now to FIG. 1, a block diagram of control environment 100 is shown, according to an exemplary embodiment. Control environment 100 is shown to include vehicle 10. In various embodiments, vehicle 10 is an agricultural vehicle. For example, vehicle 10 may be or include a hauling vehicle (e.g., a tractor-trailer, etc.) and/or a harvesting vehicle (e.g., a combine harvester, etc.). While the vehicle control system of the present disclosure is described in relation to agricultural vehicles, it should be understood that the vehicle control system is usable with other vehicles (e.g., non-agricultural vehicles) and that such embodiments are within the scope of the present disclosure. As a non-limiting example, in a landscaping context, vehicle 10 may be a lawn mower. As another non-limiting example, in a snow-clearing context, vehicle 10 may be a winter service vehicle including a snow blower. As another non-limiting example, in a construction context, vehicle 10 may be an excavation vehicle such as a bulldozer, loader (e.g., front loader, backhoe loader, track loader, etc.), power shovel, front shovel, and/or the like.

The vehicle control system of the present disclosure may offer many benefits over existing systems. For example, the vehicle control system may facilitate detecting obstacles in pinch points of a vehicle such as humans nearby a wheel well of a tractor, thereby preventing injury. In various embodiments, agricultural equipment such as a tractor pulling a chisel plow may have a number of hazard areas/pinch points that need to be checked for obstructions prior to operating the agricultural equipment. However, it may be prohibitively difficult and/or time consuming for an operator to manually check each hazard area/pinch point prior to operating the agricultural equipment. For example, an operator of a tractor may not be able to see (e.g., not have line-of-sight of, etc.) every pinch point on the tractor from the cab of the tractor. As another example, in a remote operation context, an operator may be located away from the tractor, thereby making it difficult to check the pinch points of the tractor prior to remote operation of the tractor. Moreover, existing obstacle detection and/or vision systems may be inadequate for use in an agricultural and/or construction context. For example, an agricultural context may have environmental features (e.g., airborne dust/particulate, crops, uneven terrain, etc.) that existing systems are unable to account for, thereby making existing systems unsuitable for the agricultural context. For example, existing computer vision systems may be unable to operate in an agricultural context because of the large amounts of airborne particulate associated with harvesting. As another example, existing computer vision systems may be unable to distinguish between safe/unsafe elements in an image such as the difference between a corn stalk and a human arm in a wheel well of a tractor. Therefore, there is a need for an improved vehicle control system for obstacle detection in an off-road context such as an agricultural context.

Systems and methods of the present disclosure may solve the shortcomings associated with existing systems. In various embodiments, the vehicle control system of the present disclosure uses a combination of image data and three-dimensional ultrasonic data to identify obstacles and determine whether the identified obstacles are positioned in a hazard area of the vehicle. Moreover, the vehicle control system may differentiate between elements that are expected in a scene such as corn stalks in a cornfield and elements that are not expected such as a deer sleeping below a parked tractor. In various embodiments, the vehicle control system may facilitate operation of a vehicle to prevent injury such as preventing a tractor from being turned on while there exists an obstacle in a hazard area of the tractor or an implement coupled to the tractor. Moreover, in various embodiments, the vehicle control system enables autonomous operation of a tractor. For example, the vehicle control system may automatically check the hazard areas/pinch points associated with a tractor prior to starting the tractor, thereby enabling a remote operator to operate the tractor safely. In various embodiments, the vehicle control system dynamically updates itself to adapt to changing environmental conditions such as the change of season and/or shifting agricultural practices (e.g., new vehicles, new field conditions, etc.).

Referring now specifically to vehicle 10, vehicle 10 is shown to include vehicle control system 110, human-machine interface (HMI) 120, primary mover 130, sensor(s) 140, and communication system 150. Vehicle control system 110 may detect obstacles (or a lack thereof) and perform vehicular operations as described herein. In various embodiments, vehicle control system 110 is physically located with vehicle 10. For example, vehicle control system 110 may be or include a hardware component installed in vehicle 10. Additionally or alternatively, part or all of vehicle control system 110 may be located separately of vehicle 10. For example, vehicle control system 110 may be or include a remote processing system (e.g., a server, two or more computing systems/servers in a distributed computing implementation, a cloud-based processing system, etc.) configured to receive input from control environment 100 and control vehicle 10 remotely.

HMI 120 may facilitate user interaction with vehicle 10 and/or vehicle control system 110. HMI 120 may include elements configured to present information to a user and receive user input. For example, HMI 120 may include a display device (e.g., a graphical display, a touchscreen, etc.), an audio device (e.g., a speaker, etc.), manual controls (e.g., manual steering control, manual transmission control, manual braking control, etc.), and/or the like. HMI 120 may include hardware and/or software components. For example, HMI 120 may include a microphone configured to receive user voice input and a software component configured to control vehicle 10 based on the received user voice input. In various embodiments, HMI 120 presents information associated with the operation of vehicle 10 and/or vehicle control system 110 to a user and facilitates user control of operating parameters. For example, HMI 120 may display operational parameters (e.g., fuel level, seed level, penetration depth of ground engaging tools, guidance swath, etc.) on a touchscreen display and receive user control input via the touchscreen display.

Primary mover 130 may generate mechanical energy to operate vehicle 10. For example, primary mover 130 may be or include an internal combustion engine. Additionally or alternatively, primary mover 130 may be or include an electric motor. In various embodiments, primary mover 130 is coupled to a frame of vehicle 10 and configured to provide power to a plurality of tractive elements (e.g. wheels, etc.). In various embodiments, primary mover 130 utilizes one or more fuels and/or energy storage systems (e.g., rechargeable batteries, etc.). For example, primary mover 130 may utilize diesel, gasoline, propane, natural gas, hydrogen, lithium-ion batteries, nickel-metal hydride batteries, lithium-ion polymer batteries, lead-acid batteries, nickel-cadmium batteries, and/or the like.

Sensor(s) 140 may monitor one or more parameters associated with vehicle 10. For example, sensor(s) 140 may monitor operation of primary mover 130 (e.g., torque, temperature, fuel level, airflow, etc.). Additionally or alternatively, sensor(s) 140 may monitor an environment of vehicle 10. For example, sensor(s) 140 may include cameras to view the surroundings of vehicle 10 and perform object recognition to facilitate obstacle avoidance. Additionally or alternatively, sensor(s) 140 may include three-dimensional ultrasonic sensors positioned to monitor pinch points associated with vehicle 10. Sensor(s) 140 may include engine sensors, positioning sensors, transmission sensors, chassis sensors, safety sensors, driver assistance sensors, passenger comfort sensors, entertainment systems sensors, and/or the like. In some embodiments, sensor(s) 140 monitor geospatial parameters associated with vehicle 10. For example, sensor(s) 140 may include a geolocation sensor (e.g., a GPS receiver, satellite navigation transceiver, etc.) configured to monitor a position of vehicle 10 (e.g., provide geolocation and/or time information, etc.). In various embodiments, sensor(s) 140 measure a relative position of vehicle 10. For example, sensor(s) 140 may measure a position of vehicle 10 relative to an unloading auger, another vehicle (e.g., such as harvesting vehicle 20, etc.), or an arbitrary point. Sensor(s) 140 may measure an absolute position of vehicle 10 (e.g., a location, etc.), a relative position of vehicle 10 (e.g., a displacement, a linear travel, a rotational angle, etc.), and/or a three-dimensional position of vehicle 10. In some embodiments, sensor(s) 140 receive input from external sources. For example, sensor(s) 140 may include position sensors configured to communicate with one or more beacons located throughout a farm field to determine a location of vehicle 10. As another example, sensor(s) 140 may receive relative positioning information that describes a position of vehicle 10 relative to another vehicle such as a harvesting vehicle. In various embodiments, sensor(s) 140 are physically located with vehicle 10. For example, sensor(s) 140 may include a chassis mounted infra-red sensor configured to measure crop health. Additionally or alternatively, sensor(s) 140 may be located separately of vehicle 10. For example, sensor(s) 140 may include a nitrogen sensor configured to measure soil nitrogen remotely of vehicle 10. Sensor(s) 140 may include hardware and/or software components. For example, sensor(s) 140 may include a GPS receiver configured to receive positional data and a software component configured to determine positional parameters associated with vehicle 10 (e.g., pose, speed, yaw, trajectory, etc.) based on the positional data. As another example, sensor(s) 140 may include an optical device (e.g., a camera, LIDAR sensor, etc.) configured to capture image data and a software component configured to classify obstacles based on the image data.

Communication system 150 may facilitate communication between vehicle 10 and/or vehicle control system 110 and external systems (e.g., sensor(s) 20, a fleet management system, other vehicles, etc.). Communication system 150 may be or include wired or wireless communications interfaces (e.g., jacks, antennas, transmitters, receivers, transceivers, wire terminals, etc.) for conducting data communications within control environment 100 and/or with other external systems or devices. In various embodiments, communication via communication system 150 is direct (e.g., local wired or wireless communications). Additionally or alternatively, communication via communication system 150 may utilize a network (e.g., a WAN, the Internet, a cellular network, a vehicle-to-vehicle network, etc.). For example, vehicle control system 110 may communicate with a decision support system (DSS) using a 4G and/or 5G connection (e.g., via a 4G or 5G access point/small cell base station, etc.) and may communicate with other vehicles such as a harvesting vehicle using a dedicated short-range communication channel (e.g., a vehicular ad-hoc network, etc.). In some embodiments, communication system 150 facilitates vehicle-to-vehicle (V2V) and/or vehicle-to-everything (V2X) communication. For example, communication system 150 may facilitate communication between vehicle 10 and a harvesting vehicle using the IEEE 802.11p standard (e.g., a wireless access in vehicular environments (WAVE) vehicular communication system), using the cellular vehicle-to-everything (C-V2X) standard, the dedicated short range communication (DSRC) standard, and/or the like. In some embodiments, vehicle 10 communicates via Wi-Fi.

Referring still to FIG. 1, vehicle control system 110 is shown to include processing circuit 160 having processor 162, memory 164, and model database 166. In some embodiments, vehicle control system 110 includes one or more processing circuits 160 including one or more processors 162 and one or more memories 164. Each of processors 162 can be a general purpose or specific purpose processor, an application specific integrated circuit (ASIC), one or more field programmable gate arrays (FPGAs), a group of processing components, or other suitable processing components. Each of processors 162 is configured to execute computer code or instructions stored in memory 164 or received from other computer readable media (e.g., CDROM, network storage, a remote server, etc.).

Memory 164 may include one or more devices (e.g., memory units, memory devices, storage devices, or other computer-readable media) for storing data and/or computer code for completing and/or facilitating the various processes described in the present disclosure. Memory 164 may include random access memory (RAM), read-only memory (ROM), hard drive storage, temporary storage, non-volatile memory, flash memory, optical memory, or any other suitable memory for storing software objects and/or computer instructions. Memory 164 may include database components, object code components, script components, or any other type of information structure for supporting the various activities and information structures described in the present disclosure. Memory 164 may be communicably connected to processor(s) 162 via processing circuit 160 and may include computer code for executing (e.g., by processor 162) one or more of the processes described herein.

Memory 164 is shown to include modeling circuit 170, calibration circuit 172, obstruction detection circuit 174, scene analysis circuit 176, and controller circuit 178. Modeling circuit 170 may generate and/or update one or more machine learning models. For example, modeling circuit 170 may train a convolutional neural network and/or a Siamese neural network using training data such as image data. In various embodiments, the trained convolutional neural network and/or Siamese neural network are used to detect an absence of obstacles in an area during operation of vehicle 10. Additionally or alternatively, the trained convolutional neural network and/or Siamese neural network may be used to detect obstacles. In some embodiments, modeling circuit 170 trains a number of machine learning models. For example, modeling circuit 170 may train a first machine learning model to detect a first type of obstruction (e.g., a static obstruction, etc.) in a first environmental context (e.g., daytime, etc.) and may train a second machine learning model to detect a second type of obstruction (e.g., a dynamic and/or moving obstruction, etc.) in a second environmental context (e.g., nighttime, etc.). In various embodiments, modeling circuit 170 updates the one or more models using feedback data. For example, vehicle control system 110 may execute a machine learning model to identify an obstacle in a scene, present the obstacle to a user (e.g., via a display, etc.), and the user may indicate that the obstacle is not a threat (e.g., was falsely identified, etc.), and modeling circuit 170 may update the machine learning model based on the user feedback. In various embodiments, the training data includes image data such as one or more images of a scene associated with vehicle 10. For example, modeling circuit 170 may receive a number of images from a camera mounted to vehicle 10. In various embodiments, modeling circuit 170 stores model data in model database 166. For example, modeling circuit 170 may store a trained convolutional neural network in model database 166.

Calibration circuit 172 may calibrate the one or more models generated by modeling circuit 170. Additionally or alternatively, calibration circuit 172 may calibrate sensor(s) 140 and/or data received therefrom. For example, calibration circuit 172 may calibrate image data received from a camera using three-dimensional ultrasonic data to correlate features in the image data with real-world dimensions. For example, calibration circuit 172 may determine that a rock in an image has a width of 2 feet. In various embodiments, calibration circuit 172 correlates ultrasonic data with image data to determine distance information. For example, calibration circuit 172 may use ultrasonic data to determine a distance between an ultrasonic sensor and a reference point in the image and use the determined distance to generate a calibrated scale for the image. In various embodiments, calibration circuit 172 may detect when a model and/or a sensor (or data therefrom) go out of calibration. For example, calibration circuit 172 may detect a change in an orientation of a camera that causes the camera to no longer be calibrated to the calibrated scale and may recalibrate the camera.

Obstruction detection circuit 174 may analyze sensor data (e.g., from sensor(s) 140 and/or sensor(s) 20, etc.) to identify a lack of obstacles in an area associated with vehicle 10. Additionally or alternatively, obstruction detection circuit 174 may identify obstacles. For example, obstruction detection circuit 174 may receive first information relating to obstacles detected from three-dimensional ultrasonic data and second information relating to obstacles detected from image data and may determine whether an obstacle exists in a hazard area of vehicle 10 based on the first and second information. Additionally or alternatively, obstruction detection circuit 174 may use other data such as LIDAR data, GPS data, and/or context data (e.g., information about environmental conditions such as an amount of ambient light, temperature, vehicle traction, etc.). In some embodiments, obstruction detection circuit 174 receives operating parameters associated with vehicle 10. For example, in a moving context, obstruction detection circuit 174 may receive a speed of vehicle 10 and may use the speed to facilitate determining a lack of obstacles in a series of images associated with vehicle motion (e.g., by accounting for changes in the images due to the motion of the vehicle, etc.). In some embodiments, obstruction detection circuit 174 determines whether an identified obstacle is a safety hazard (e.g., is within a hazard area of vehicle 10, etc.). For example, obstruction detection circuit 174 may receive data identifying an obstacle and may determine whether the obstacle is positioned within (or expected to enter) a hazard area of vehicle 10. In various embodiments, obstruction detection circuit 174 transmits one or more control signals to controller circuit 178. For example, obstruction detection circuit 174 may identify an obstruction located under vehicle 10 and may send a control signal to controller circuit 178 to prevent vehicle 10 from being started.

Scene analysis circuit 176 may analyze image data to detect an absence of obstacles in in the image data. Additionally or alternatively, scene analysis circuit 176 may identify one or more obstacles in the image data. For example, scene analysis circuit 176 may receive a number of images captured by cameras mounted on vehicle 10 and may execute a machine learning model using the images to determine whether an obstacle exists in any of the images. In various embodiments, scene analysis circuit 176 performs background subtraction to identify changes in a scene corresponding to potential obstacles. For example, scene analysis circuit 176 may compare one or more images of a scene to a model of the scene (e.g., a collection of images of the scene while the scene is free of obstacles, etc.) to generate a similarity score corresponding to a change in the scene. In various embodiments, scene analysis circuit 176 compares the similarity score to a threshold to determine whether an obstacle exists in the scene. In some embodiments, scene analysis circuit 176 executes a machine learning model such as a convolutional neural network and/or a Siamese neural network to determine whether an obstacle exists in one or more images associated with a scene. Additionally or alternatively, scene analysis circuit 176 may execute a number of machine learning models. For example, scene analysis circuit 176 may execute a first machine learning model to identify a first type of feature in a scene (e.g., a moving obstacle, etc.) and may execute a second machine learning model to perform post-processing associated with the first type of feature (e.g., object tracking, etc.).

Controller circuit 178 may facilitate control of vehicle 10. For example, controller circuit 178 may receive an indication that there is an obstacle in a hazard area of vehicle 10 from obstruction detection circuit 174 and generate control signals for primary mover 130 to operate vehicle 10 (e.g., to prevent vehicle 10 from starting, etc.). In some embodiments, controller circuit 178 may facilitate autonomous and/or semi-autonomous operation of vehicle 10. Additionally or alternatively, controller circuit 178 may receive information from external sources and operate vehicle 10 based on the received information. For example, controller circuit 178 may receive a route from an external controller (e.g., a cloud-based control system, etc.) and operate vehicle 10 based on the received route.

Model database 166 may store one or more machine learning models. For example, model database 166 may store a convolutional neural network generated by model builder 170. In various embodiments, the one or more machine learning models include a neural network trained using image data to identify features in a scene such as obstacles (or a lack thereof). For example, model database 166 may store a neural network representing a default scene (e.g., an obstacle-free scene, etc.) and vehicle control system 110 may use the neural network to identify obstacles in image data. As another example, model database 166 may store one or more images representing an obstacle-free scene (e.g., a clear background, etc.).

Control environment 100 may include sensor(s) 20. Sensor(s) 20 may be or include sensors that are external to vehicle 10. For example, sensor(s) 20 may include cameras and/or three-dimensional ultrasonic sensors positioned on an implement coupled to vehicle 10. As another example, sensor(s) 20 may include cameras positioned on another vehicle nearby vehicle 10 (e.g., such that the cameras have at least a partial view of a hazard area associated with vehicle 10, etc.). Vehicle control system 110 may communicate with sensor(s) 20 to facilitate obstacle detection. Sensor(s) 20 may include LIDAR sensors, multi-spectral/hyperspectral sensors such as ultraviolet cameras and/or infrared cameras, and/or the like. In some embodiments, sensor(s) 20 include illuminators such as light-emitting diodes (LEDs) or lasers. For example, sensor(s) 20 may include a camera having a 700-900 nanometer bandpass filter and a LED configured to emit 800 nanometer light that can illuminate a scene and be detected by the camera. In various embodiments, specialized cameras such as those including hyperspectral sensors may be paired with illuminators to view areas lacking ambient light (e.g., by illuminating an area with the illuminator and capturing an image of the illuminated area using a hyperspectral sensor, to see in the dark, etc.).

Figure 2:
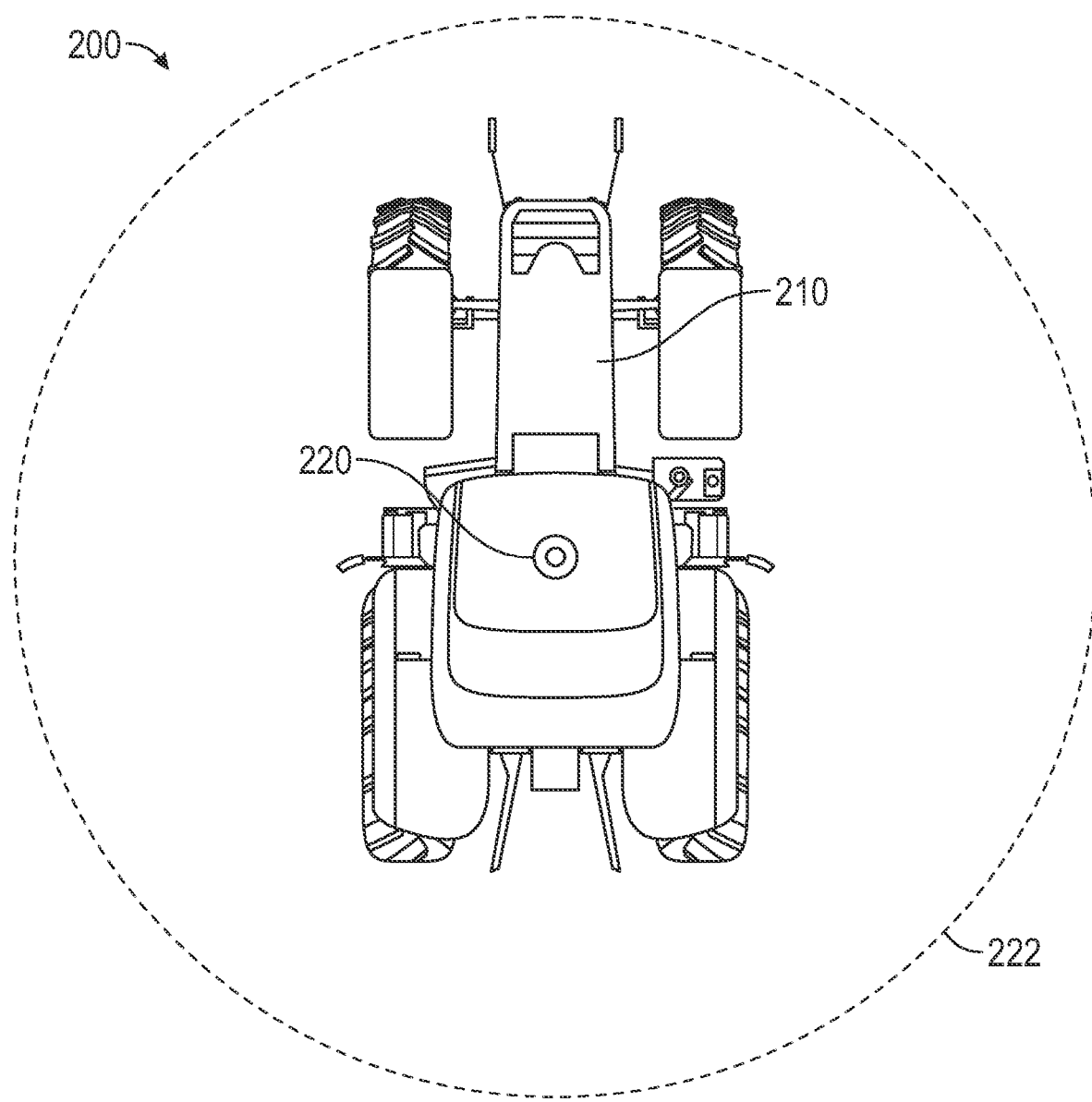
FIG. 2 is a diagram illustrating a vehicle having an obstacle detection system, according to an exemplary embodiment.

Referring now to FIG. 2, a diagram illustrating environment 200 integrating vehicle control system 110 for performing obstacle detection with an agricultural vehicle is shown, according to an exemplary embodiment. In various embodiments, environment 200 includes vehicle 210. Vehicle 210 may be an agricultural vehicle such as a tractor configured to tow one or more implements such as a grain cart. Vehicle 210 may include one or more sensors, shown as camera 220. Camera 220 may be coupled to a cab of vehicle 210 such that camera 220 has a 360° view of vehicle 210. For example, camera 220 may include a camera mounted on a pan/shift/roll mount to facilitate the camera to view various exterior portions of vehicle 210. As another example, camera 220 may include a camera mounted on a rail system (e.g., on top of a cab of vehicle 210, around a roofline of vehicle 210, etc.) to dolly, pedestal, truck, pan, tilt, and/or roll the camera to facilitate the camera to view various exterior portions of vehicle 210. In various embodiments, hazard area 222 may be associated with vehicle 210. For example, camera 220 may monitor hazard area 222 for one or more obstacles (e.g., people, equipment, animals, etc.) that may pose a risk to vehicle 210. As another example, camera 220 may monitor hazard area 222 to detect the presence or absence of obstacles in an area around vehicle 210. Hazard area 222 is shown as a two-dimensional circle centered on vehicle 210, however it should be understood that hazard area 222 may take different shapes and/or sizes. For example, hazard area 222 may include a sphere centered on vehicle 210. As another example, hazard area 222 may be a custom three-dimensional volume (e.g., a non-uniform volume, etc.) tailored to dimensions of vehicle 210 and/or an implement coupled to vehicle 210 (e.g., a grain cart, etc.).

In some embodiments, a shape and/or size of hazard area 222 is updated dynamically. For example, vehicle 210 may have a first circular hazard area having a first radius when vehicle 210 is stationary and may have a second oblong hazard area having a first dimension and a second dimension when vehicle 210 is moving. As another example, vehicle 210 may have a first hazard area having a first shape when an implement of vehicle 210 is operating in a first mode (e.g., a grain cart having an auger retracted, etc.) and may have a second hazard area having a second shape when an implement of vehicle 210 is operating in a second mode (e.g., a grain cart having an auger extended, etc.).

In various embodiments, the vehicle control system of the present disclosure (e.g., vehicle control system 110, etc.) may receive one or more images of a scene associated with hazard area 222 and may identify the presence/absence of one or more obstacles in the scene and/or determine whether the one or more obstacles are in hazard area 222 (or are expected to enter hazard area 222, etc.). Additionally or alternatively, the vehicle control system may distinguish between objects that pose a risk (e.g., a human nearby a tillage implement of vehicle 210, etc.) and should be treated as obstacles and those that do not (e.g., a cornstalk in a cornfield, etc.). In various embodiments, the vehicle control system may combine information from camera 220 with information from one or more ultrasonic sensors to identify potential obstacles (or a lack thereof). For example, the vehicle control system may check for any obstacles in hazard area 222 and/or any pinch points associated with vehicle 210 prior to startup of vehicle 210 (e.g., turning on an engine of vehicle 210, powering any accessories of vehicle 210, etc.).

Figure 3:
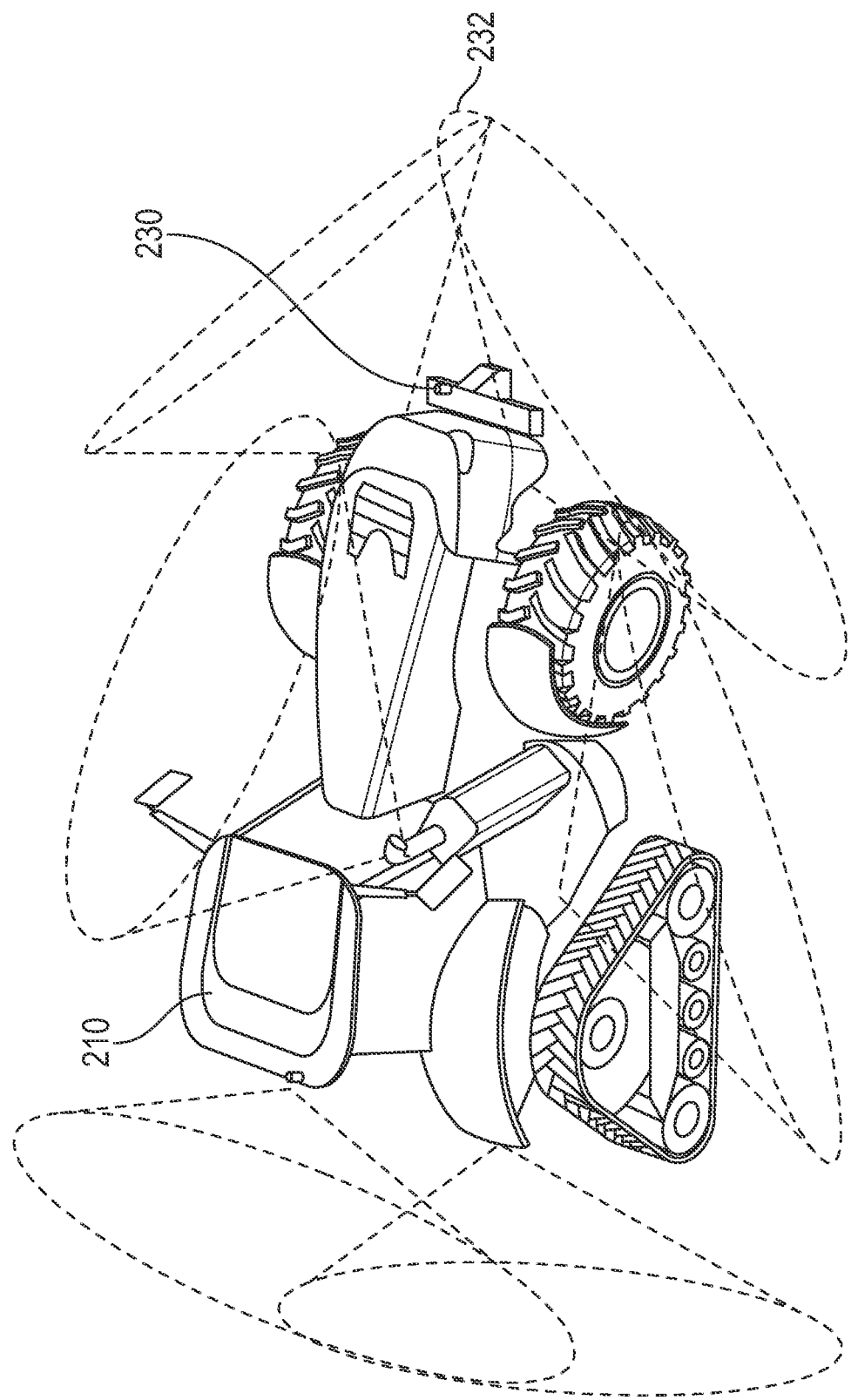
FIG. 3 is another diagram illustrating a vehicle having an obstacle detection system, according to an exemplary embodiment.

Referring now to FIG. 3, a diagram illustrating environment 300 integrating vehicle control system 110 for performing obstacle detection with an agricultural vehicle is shown, according to an exemplary embodiment. In various embodiments, environment 300 includes vehicle 210. Vehicle 210 may be an agricultural vehicle as described above with reference to FIG. 2. Vehicle 210 may include one or more sensors, shown as ultrasonic sensors 230. Ultrasonic sensors 230 may be three-dimensional ultrasonic sensors. Ultrasonic sensors 230 may be coupled to a body of vehicle 210 such that ultrasonic sensors 230 may monitor one or more pinch points of vehicle 210. Pinch points may include portions of vehicle 210 (or an implement coupled thereto) where an object such as a human may be positioned and threaten a safety of vehicle 210 and/or the object. For example, pinch points on a tractor may include a space between a wheel of the tractor and a body of the tractor, an area around a hitch of the tractor, an area between the tractor and the ground, an area between a tractor and an attached implement, and/or the like. In various embodiments, pinch points differ by vehicle. For example, a lawn mower may have a first number/shape/positioning/distribution of pinch points and a combine harvester may have a second number/shape/positioning/distribution of pinch points. In some embodiments, pinch points are determined dynamically. For example, the vehicle control system of the present disclosure may generate a pinch point associated with a space between a body of a combine harvester and an auger of the combine harvester in response to the auger being extended away from the body of the combine harvester.

In various embodiments, ultrasonic sensors 230 have sensing areas 232. Sensing areas 232 may correspond to regions of space monitored by ultrasonic sensors 230. For example, a first ultrasonic sensor may have a first sensing area covering a pinch point monitored by the first ultrasonic sensor. In various embodiments, each pinch point associated with vehicle 210 (and implements coupled thereto) is monitored by at least one of ultrasonic sensors 230.

In various embodiments, the vehicle control system of the present disclosure (e.g., vehicle control system 110, etc.) may receive information (e.g., position information, size information, orientation information, etc.) from ultrasonic sensors 230 and may identify one or more obstacles in a pinch point/hazard area of vehicle 210 using the information. For example, the vehicle control system may determine that a position of an object detected by ultrasonic sensors 230 corresponds to a pinch point of vehicle 210. In some embodiments, the vehicle control system uses ultrasonic sensors 230 to verify a position of an obstacle identified using image data. Additionally or alternatively, the vehicle control system may identify obstacles using ultrasonic sensors 230 without image data.

Figure 4A:
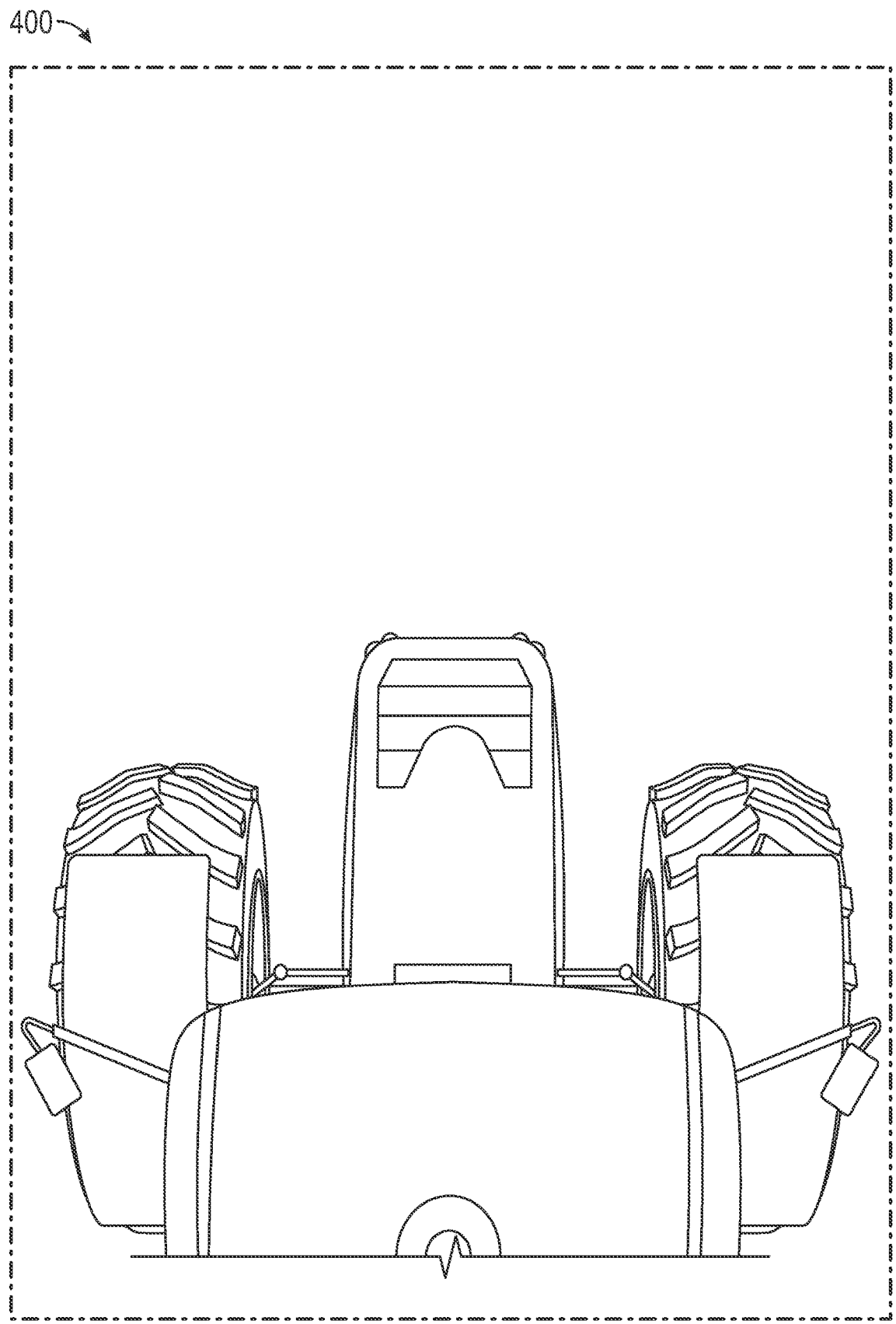
FIGS. 4A-4C are images from an obstacle detection system integrated with a vehicle, according to an exemplary embodiment.
Figure 4B:
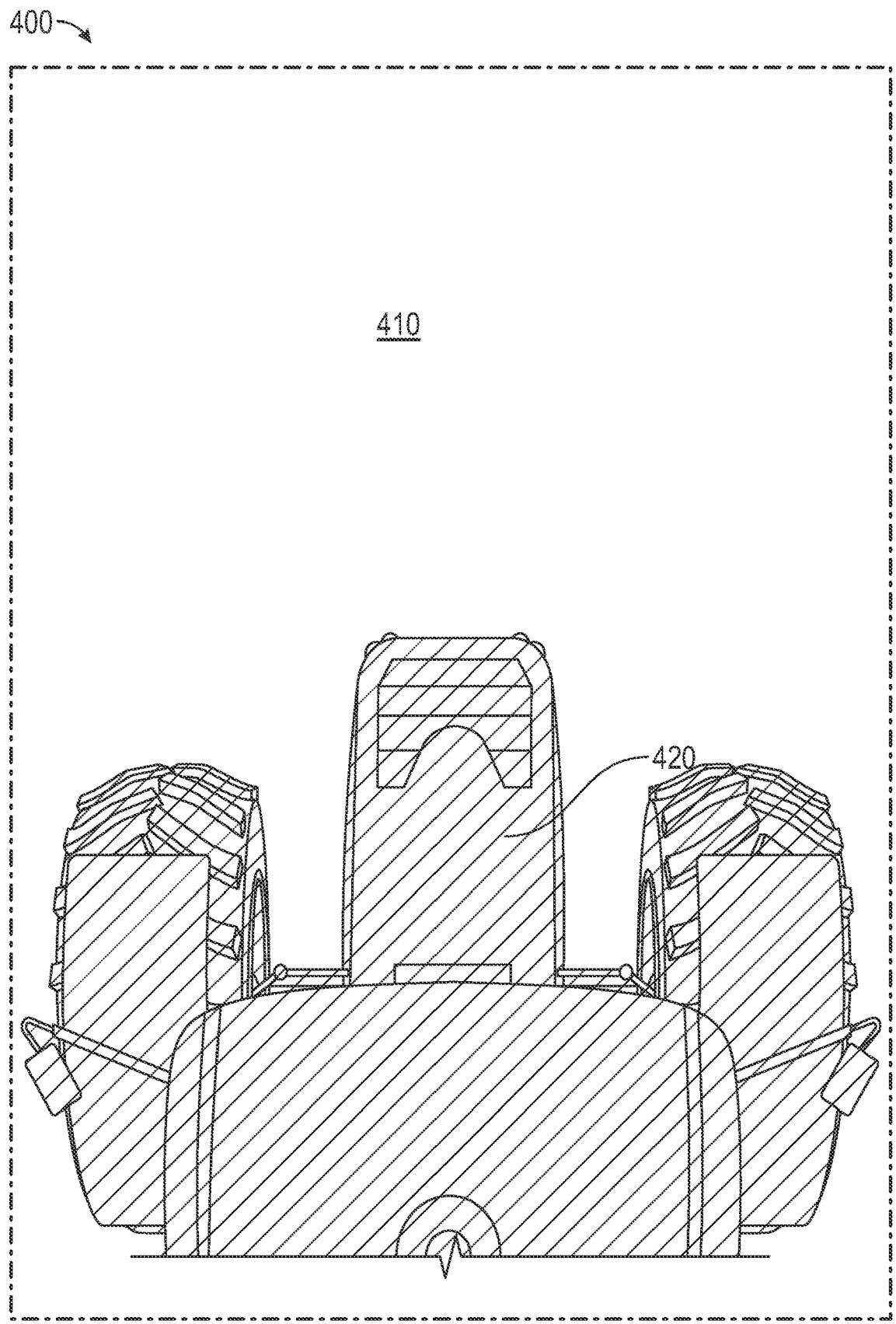
Figure 4C:
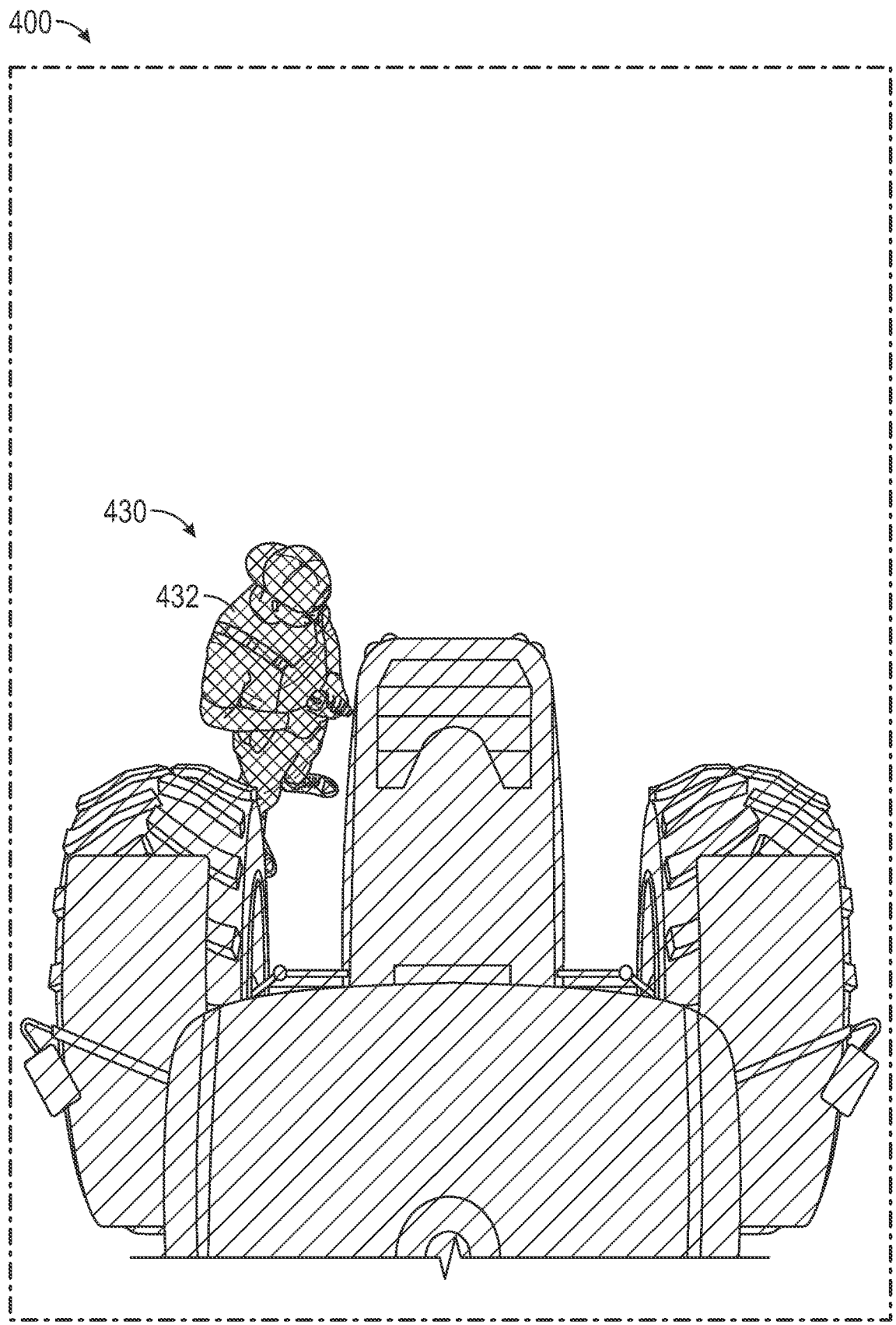

Referring now to FIGS. 4A-4C, image 400 for performing obstacle detection is shown, according to various exemplary embodiments. In various embodiments, image 400 is produced by one or more cameras mounted on a vehicle such as an agricultural vehicle. For example, image 400 may be produced by a camera mounted to the top of a tractor cab. In various embodiments, the vehicle control system of the present disclosure analyzes image 400 to identify obstacles (or a lack thereof). For example, the vehicle control system may check for obstacles in a number of hazard areas/pinch points around a tractor prior to starting the tractor. In some embodiments, image 400 is a composite of a number of images (e.g., a mosaic, etc.). In various embodiments, the vehicle control system generates one or more machine learning models to analyze image 400 for obstacles. For example, the vehicle control system may be initiated (e.g., trained, etc.) using a number of images having labeled features (e.g., obstacles, foreground elements, background elements, etc.). In some embodiments, the vehicle control system analyzes image 400 using a background model representing "normal" conditions (e.g., without any obstacles present, etc.). For example, the vehicle control system may perform background subtraction using image 400 and a model image of an obstacle-free scene. In some embodiments, the model image has a similar view as image 400. For example, the model image may be taken from the same camera with the same settings (e.g., orientation, framing, etc.) as image 400. Additionally or alternatively, the model image may have a different view than image 400. For example, the model image may include a composite mosaic showing a 360° view of an exterior of a tractor.

Referring now specifically to FIG. 4B, the vehicle control system may label one or more features in image 400. For example, the vehicle control system may perform background subtraction and label background 410 and foreground 420 in image 400. As another example, the vehicle control system may label edges in image 400 (e.g., using a spatial frequency filter to isolate high frequency components of image 400, etc.). As another example, the vehicle control system may label gradient features such as intensity and/or color in image 400. As another example, the vehicle control system may perform object recognition and label objects in a scene such as rocks, crops, trees, animals, and/or the like.

In some embodiments, the vehicle control system labels portions of image 400 associated with hazard areas/pinch points. For example, the vehicle control system may label a portion of image 400 associated with a space between a wheel and a body of a tractor as a hazard area. In some embodiments, the vehicle control system explicitly identifies features within image 400. For example, the vehicle control system may maintain a database having a table of image features that may be mapped to image 400. Additionally or alternatively, the vehicle control system may implicitly identify features within image 400. For example, the vehicle control system may execute a machine learning model such as a convolutional neural network using image 400 to implicitly identify features within image 400 (e.g., where the features identified by the convolutional neural network are represented by one or more hidden layers of the convolutional neural network and are not explicitly interpretable by an operator, etc.) and produce an output associated with image 400. As another example, the vehicle control system may execute a Siamese neural network using image 400 to identify features within image 400 and produce an output such as a similarity score describing a similarity of image 400 to a model such as a model of an obstruction-free scene. In various embodiments, Siamese neural networks may be used to compare two or more models such as an image of an obstacle-free scene and an image of a current scene associated with a tractor. For example, a Siamese neural network (e.g., using the same weights working on two different input vectors, etc.) may compare a clear background image to a current camera image to determine an added distance function (e.g., a L2 norm, a Euclidean distance, etc.) describing how similar the current camera image is to the clear background image. It should be understood that while comparing images/models of a scene is described in relation to Siamese neural networks, other implementations are possible and the present disclosure is not limited to any one implementation.

In some embodiments, the vehicle control system labels each pixel of image 400. For example, the vehicle control system may label each pixel of image 400 as either background 410 or foreground 420. Additionally or alternatively, the vehicle control system may label a group of pixels. For example, the vehicle control system may label a group of 112 pixels corresponding to an edge in image 400. In some embodiments, the number of pixels associated with a label varies based on the feature being labeled. For example, a small rock may be labeled with a first number of pixels and a large rock may be labeled with a second number of pixels that is greater than the first number of pixels. In various embodiments, pixels may have one or more labels. For example, a pixel may be labeled as relating to a background of image 400 and also an obstacle.

In various embodiments, background 410 corresponds to elements in image 400 that are different than a model image. For example, the vehicle control system may compare image 400 to a model image where an exterior view of the tractor is the same between image 400 and the model image such that the vehicle control system labels the exterior view of the tractor as foreground 420 and the rest of image 400 (e.g., the parts of image 400 that are not the same as/similar to the model image, etc.) as background 410. In various embodiments, the vehicle control system accounts for image variations during labeling of image 400. For example, the vehicle control system may account for differences in lighting, coloring, framing, and/or the like. As another example, the vehicle control system may identify a hood of a tractor as foreground 420 using a model image having a different framing than image 400 and having different shadows cast on the hood than in image 400. In some embodiments, the vehicle control system uses background 410 and foreground 420 to improve a computational speed of obstacle detection. For example, the vehicle control system may label a portion of image 400 as foreground 420 and may exclude foreground 420 from obstacle detection because those portions of image 400 are known to correspond to non-obstacle elements (e.g., a hood of a tractor, etc.), thereby saving computational resources and/or enabling less expensive processing circuits to be used for the vehicle control system. In various embodiments, background 410 corresponds to potential obstacles. For example, if no obstacles exist in an image then the vehicle control system may label the entire image background 410. In various embodiments, the vehicle control system executes a machine learning model such as a convolutional neural network and/or a Siamese neural network to determine background 410 and/or foreground 420. For example, a Siamese neural network may be executed using (i) a camera image of an area associated with a tractor and (ii) a model of a "clear" or "normal" operational background to detect the absence of obstacles/detect a clear background, label the portions of the camera image corresponding to the "clear" or "normal" operational background as foreground 420, and label the portions of the camera image corresponding to a potential obstacle (e.g., not a normal background, etc.) as background 410.

Referring now specifically to FIG. 4C, the vehicle control system may label obstacles in image 400. For example, the vehicle control system may label human 432 as obstacle 430 in image 400. In some embodiments, the vehicle control system executes a machine learning model such as a convolutional neural network using image 400 to identify obstacles. The vehicle control system may label objects located in a hazard area of image 400 as obstacle 430. For example, the vehicle control system may analyze portions of image 400 labeled as hazard areas for the presence of objects and if found, label the objects as obstacle 430. In some embodiments, the vehicle control system analyzes background 410 to identify portions of background 410 related to obstacle 430. In various embodiments, the vehicle control system may verify obstacle(s) 430 using other sensor data (e.g., ultrasonic sensor data, etc.). For example, the vehicle control system may identify obstacle 430 and may query a three-dimensional ultrasonic sensor monitoring a pinch point corresponding to a position of obstacle 430 to determine whether the three-dimensional ultrasonic sensor detects an obstacle in the pinch point. Additionally or alternatively, the vehicle control system may use ultrasonic sensor data to identify obstacle(s) 430 in image 400. For example, the vehicle control system may calibrate image 400 using ultrasonic sensor data, may detect an object using ultrasonic sensor data, and may map a location of the detected object to image 400 using the calibration.

In some embodiments, the vehicle control system performs one or more pre-processing and/or post-processing operations using image 400. For example, the vehicle control system may perform a pre-processing operation including applying a spatial frequency filter to image 400 to identify edges in image 400. As another example, the vehicle control system may perform a post-processing operation including object recognition to identify (e.g., as a rock, a human, crops, etc.) an object labeled as an obstacle in image 400. The vehicle control system may use the identified object to determine whether the object is a valid obstacle (e.g., whether the object is an arm of a human in a pinch point or a corn stalk in a pinch point, etc.). As another example, the vehicle control system may perform a post-processing operation such as object tracking to track a position of an object labeled as an obstacle in image 400 (e.g., to determine whether the obstacle is likely to enter a hazard area of the vehicle, etc.). As yet another example, the vehicle control system may perform a post-processing operation such as saving a position and/or features of an identified obstacle (e.g., GPS coordinates, an object description such as: "rock," a size, a threat level, a confidence metric, whether the obstacle can move or not, etc.) in a database for future use in path-planning, to facilitate mapping a field, and/or to facilitate obstacle avoidance in other vehicles that are not equipped with a vision system (e.g., but are able to avoid obstacles based on GPS position, etc.).

Figure 5A:
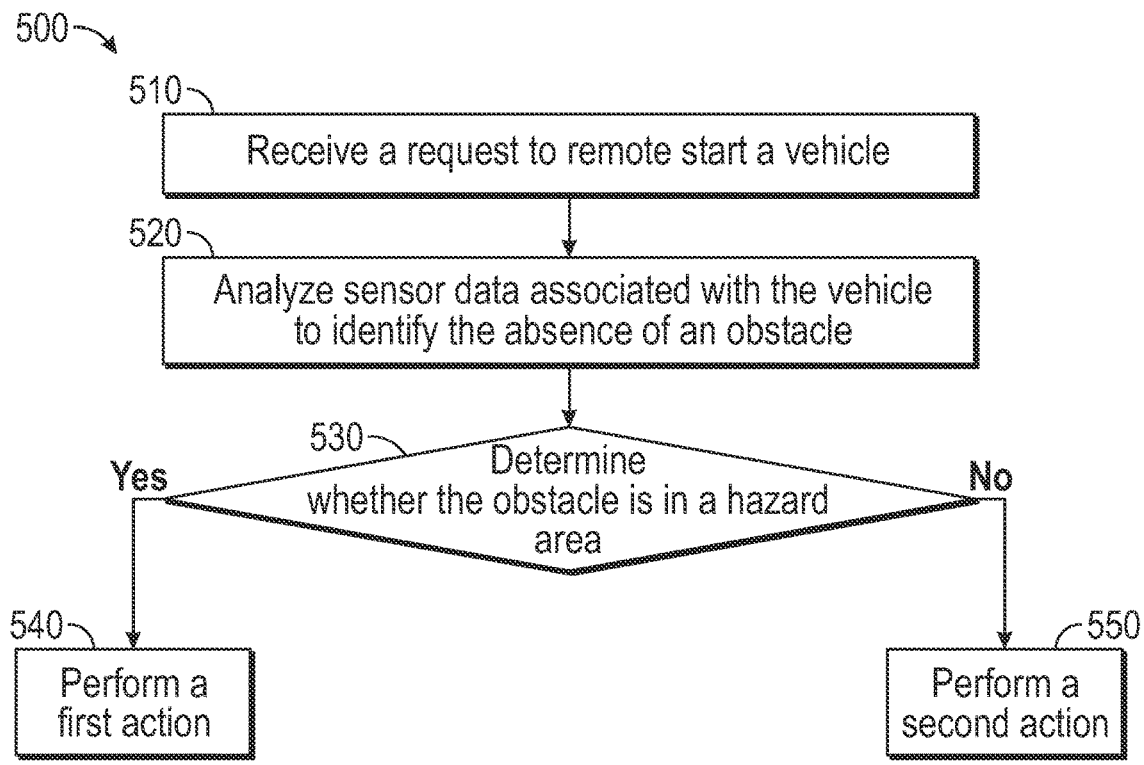
FIGS. 5A-5B are flow diagrams illustrating a method of obstacle detection, according to an exemplary embodiment.
Figure 5B:
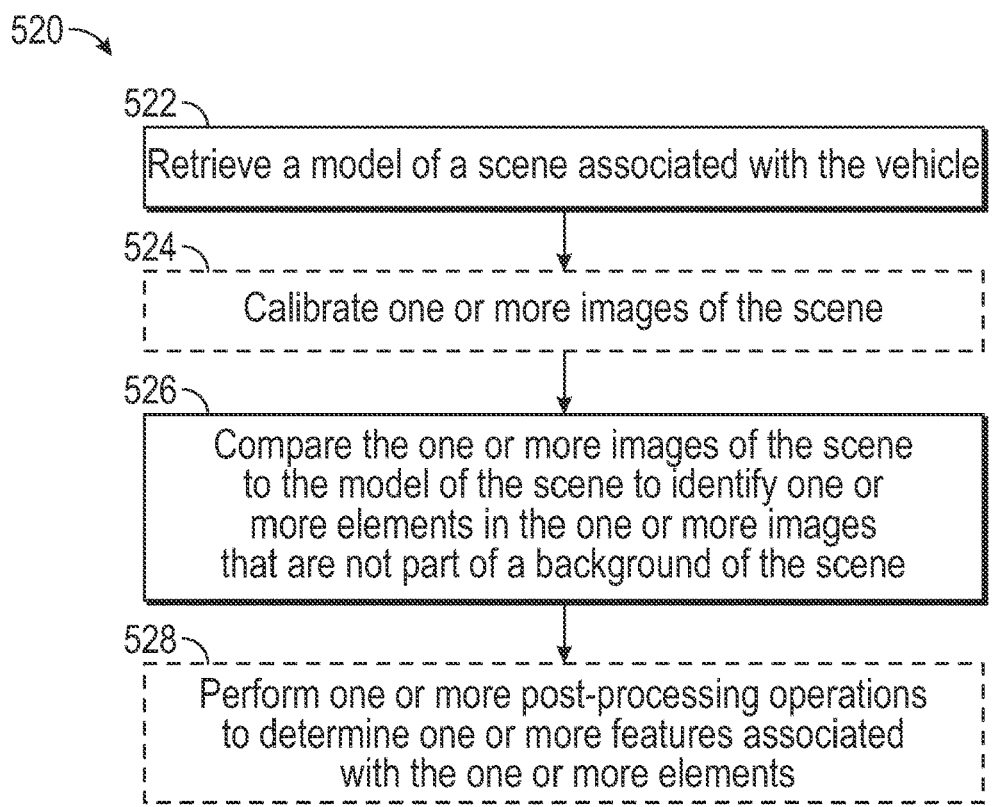

Referring now to FIGS. 5A-5B, method 500 for performing obstacle detection is shown, according to an exemplary embodiment. In various embodiments, vehicle control system 110 performs method 500. At step 510, vehicle control system 110 may receive a request to remote start a vehicle. For example, vehicle control system 110 may receive a request from a remote operator to remote start a tractor. While method 500 is described in relation to a remote start operation, it should be understood that method 500 may be performed in response to various events/inputs. For example, vehicle control system 110 may perform method 500 prior to remotely piloting (e.g., driving, etc.) a combine harvester. At step 520, vehicle control system 110 may analyze sensor data associated with the vehicle to identify the absence of an obstacle. For example, vehicle control system 110 may execute a Siamese neural network using an image of a scene and a model of a "clear" or "normal" (e.g., obstacle-free) scene to detect the absence of obstacles/a clear background in the image. Additionally or alternatively, step 520 may include detecting obstacles in a scene. For example, vehicle control system 110 may execute a machine learning model using image data to identify one or more objects and may determine that the one or more objects represent obstacles in a hazard area of the vehicle using ultrasonic data. In various embodiments, step 520 includes combining multiple data sources. For example, vehicle control system 110 may combine image data and ultrasonic data to identify obstacles (or a lack thereof).

At step 530, vehicle control system 110 may determine whether the obstacle is in a hazard area. For example, vehicle control system 110 may determine whether one or more pixels labeled as relating to an obstacle are also labeled as relating to a hazard area. As another example, vehicle control system 110 may use a calibrated image (e.g., an image from which real-world measurements may be made, etc.) to determine a position of an object and compare the position of the object to a position of a hazard area. In some embodiments, the one or more machine learning models executed by vehicle control system 110 may output a determination of whether an object is in a hazard area. In various embodiments, step 530 is performed in response to determining that a scene is not free of obstacles.

If the obstacle is in a hazard area (step 530: Yes), then vehicle control system 110 may perform a first action (step 540). For example, vehicle control system 110 may transmit a picture of the obstacle to a user (e.g., where the obstacle is emphasized or otherwise identified, etc.). As another example, vehicle control system 110 may prevent the vehicle from being remotely started. As yet another example, vehicle control system 110 may ask a user to confirm that the obstacle is an obstacle (e.g., where the user may override the determination of vehicle control system 110, etc.). If the obstacle is not in a hazard area (step 530: No), then vehicle control system 110 may perform a second action (step 550). For example, vehicle control system 110 may remotely start the vehicle.

Referring now specifically to FIG. 5B, step 520 is shown in greater detail, according to an exemplary embodiment. At step 522, vehicle control system 110 may retrieve a model of a scene associated with the vehicle. For example, vehicle control system 110 may retrieve a background model representing "normal" conditions around the vehicle (e.g., obstacle-free conditions, etc.). In some embodiments, step 522 may include retrieving a number of models. For example, vehicle control system 110 may retrieve a first Siamese neural network for identifying first features of the scene and a second Siamese neural network for identifying second features of the scene.

At step 524, vehicle control system 110 may calibrate one or more images of the scene. For example, vehicle control system 110 may use ultrasonic data to determine real-world distances associated with features in an image and create a three-dimensional model of a scene based on one or more images. In various embodiments, step 524 is optional. At step 526, vehicle control system 110 may compare the one or more images of the scene to the model of the scene to identify one or more elements in the one or more images that are not part of a normal/clear background of the scene. For example, vehicle control system 110 may compare a sum of squared errors associated with an output of a first Siamese neural network and an output of a second Siamese neural network. As another example, a Siamese neural network may generate a L2 norm (e.g., L2 distance, etc.) describing a difference between two images (e.g., a first image of a scene and a second image of a clear normal/clear background, etc.). As yet another example, vehicle control system 110 may perform background subtraction to identify the one or more elements (or a lack thereof). In some embodiments, the comparison is performed on a pixel by pixel basis. Additionally or alternatively, the comparison may be performed using groups of pixels or an entire image. As another example, vehicle control system 110 may compare a similarity score (e.g., as generated by a Siamese neural network, etc.) associated with a comparison between the one or more images and the model to a threshold to determine whether one or more elements are part of a normal/clear background of the scene. In some embodiments, step 526 includes labeling the one or more elements.

At step 528, vehicle control system 110 may perform one or more post-processing operations to determine one or more features associated with the one or more elements. For example, vehicle control system 110 may perform object classification and/or object tracking. As another example, vehicle control system 110 may identify objects labeled as crops that are bending in a manner that would not be expected of crops and may reanalyze the objects based on the identification. As another example, vehicle control system 110 may identify an object labeled as a crop that is a different color than would be expected for a crop and may update a machine learning model based on determining that the label is incorrect. In various embodiments, step 528 is optional.

Figure 6:
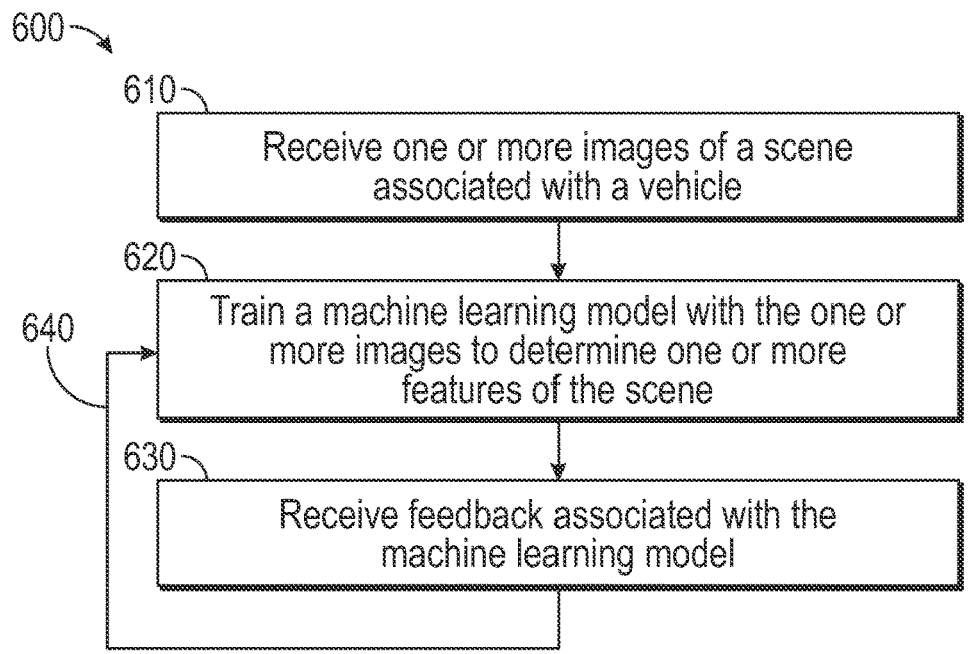
FIG. 6 is a flow diagram illustrating a method of training a machine learning model for obstacle detection, according to an exemplary embodiment.

Referring now to FIG. 6, method 600 for training a machine learning model for obstacle detection in an off-road context such as an agricultural context is shown, according to an exemplary embodiment. In various embodiments, vehicle control system 110 performs method 600. At step 610, vehicle control system 110 may receive one or more images of a scene associated with a vehicle. In various embodiments, the one or more images are captured from one or more cameras mounted on the vehicle. Additionally or alternatively, the one or more images may be from a training dataset. At step 620, vehicle control system 110 may train a machine learning model with the one or more images to determine one or more feature of the scene. For example, vehicle control system 110 may train a convolutional neural network. The features may include a foreground/background of the image, an edge, gradient features, color, and/or the like. In various embodiments, the features are pixel-specific features. Additionally or alternatively, the features may encompass a number of pixels. In various embodiments, features may be labeled based on relevancy. For example, the machine learning model may label an object in a hazard area as an obstacle and an object outside of a hazard area as a background object. In some embodiments, step 620 includes populating a table of features.

At step 630, vehicle control system 110 may receive feedback associated with the machine learning model. For example, vehicle control system 110 may execute the machine learning model to identify an obstacle, present the obstacle to a user, receive feedback from the user indicating the obstacle is improperly labeled (e.g., is not an obstacle, does not pose a threat, etc.), and may update the machine learning model based on the feedback. In some embodiments, the feedback is manual user feedback. In various embodiments, method 600 includes updating the machine learning model (step 640) based on the received feedback. For example, vehicle control system 110 may receive new images and may update the machine learning model using the new images to adapt to changing environmental conditions (e.g., the change the seasons, etc.).

Figure 7:
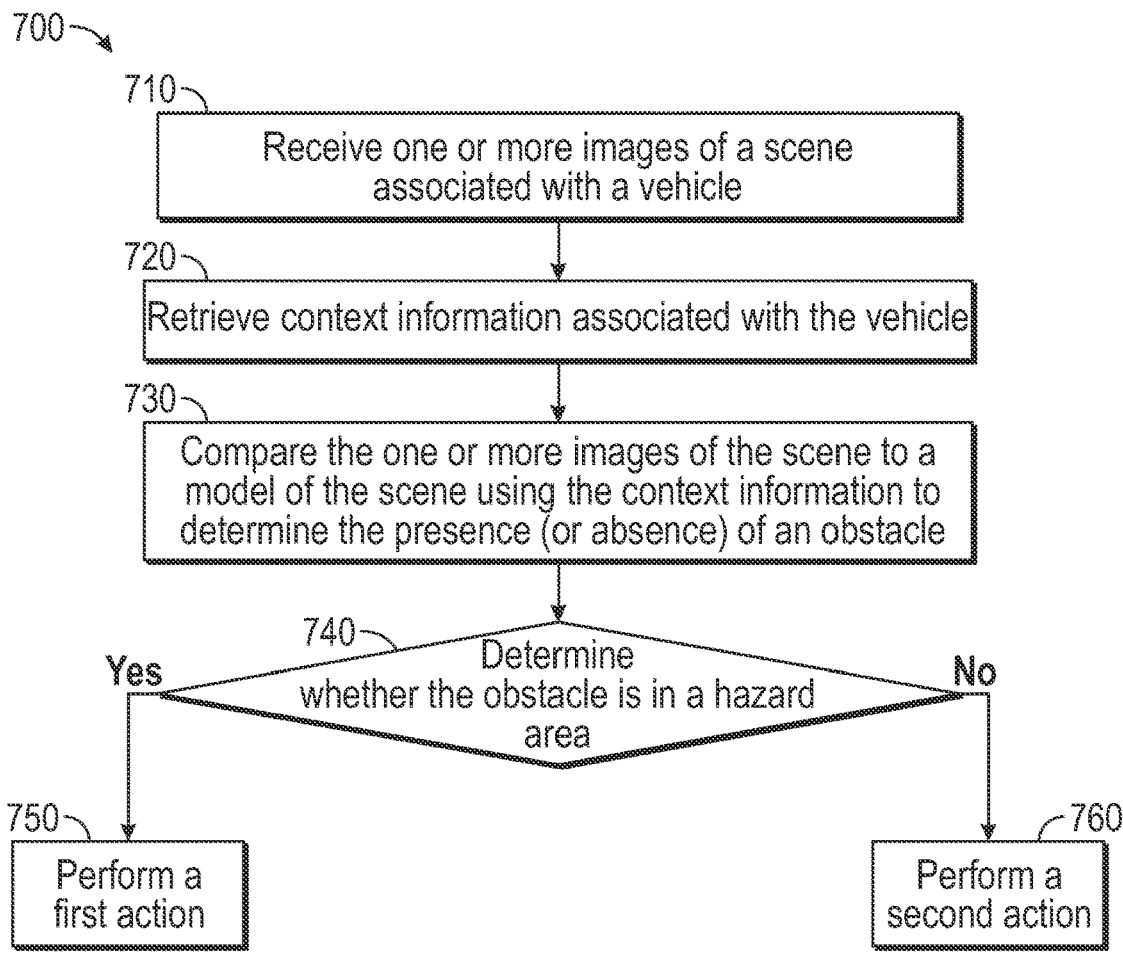
FIG. 7 is a flow diagram illustrating a method of dynamic obstacle detection, according to an exemplary embodiment.

Referring now to FIG. 7, method 700 for performing dynamic obstacle detection is shown, according to an exemplary embodiment. In various embodiments, vehicle control system 110 performs method 700. For example, vehicle control system 110 may perform method 700 while a vehicle controlled by vehicle control system 110 is moving. At step 710, vehicle control system 110 may receive one or more images of a scene associated with a vehicle. For example, vehicle control system 110 may receive a number of images from a tractor while the tractor is operating (e.g., hauling grain, in motion, etc.).

At step 720, vehicle control system 110 may retrieve context information associated with the vehicle. For example, vehicle control system 110 may retrieve speed and position information from the vehicle to determine a speed, position, and/or orientation of the vehicle. At step 730, vehicle control system 110 may compare the one or more images of the scene to a model of the scene using the context information to determine the presence of an obstacle (or a lack thereof). For example, vehicle control system 110 may perform obstacle detection as described in detail above while accounting for motion using the context information such as a speed of the vehicle. In some embodiments, step 730 includes updating the model such as updating a background model used to identify obstacles with the one or more images.

At step 740, vehicle control system 110 may determine whether the obstacle is in a hazard area. For example, vehicle control system 110 may determine whether the obstacle is in a hazard area of the vehicle by querying an ultrasonic sensor monitoring a hazard area associated with a position of the obstacle to verify a position of the obstacle. If the obstacle is in the hazard area (step 740: Yes), then vehicle control system 110 may perform a first action (step 750). For example, vehicle control system 110 may alter a path of the vehicle to avoid the obstacle. As another example, vehicle control system 110 may stop the vehicle. If the obstacle is not in the hazard area (step 740: No), then vehicle control system 110 may perform a second action (step 760). For example, vehicle control system 110 may continue operating the vehicle as normal.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

What is claimed is:

1. A vehicle control system for an agricultural vehicle, the vehicle control system comprising:
 a processing circuit including a processor and memory, the memory having instructions stored thereon that, when executed by the processor, cause the processing circuit to:
 receive (i) image data depicting at least a portion of a hazard area associated with the agricultural vehicle and (ii) ultrasonic sensor data from an ultrasonic sensor monitoring the hazard area, wherein the hazard area is dynamically updated based on a change in an implement operating mode of the agricultural vehicle;

determine, based on a combination of the image data and the ultrasonic sensor data, whether an obstacle is positioned at least partially within the hazard area; and perform an action with respect to the agricultural vehicle in response to a determination that the obstacle is positioned at least partially within the hazard area.

2. The vehicle control system of claim 1, wherein determining whether the obstacle is positioned at least partially within the hazard area includes performing background subtraction using the image data and a background model.

3. The vehicle control system of claim 2, wherein performing background subtraction using the image data includes labeling one or more pixels of the image data as foreground pixels and one or more pixels of the image data as background pixels.

4. The vehicle control system of claim 1, wherein determining whether the obstacle is positioned at least partially within the hazard area includes executing a machine learning model using the image data to identify an object in the image data.

5. The vehicle control system of claim 4, wherein determining whether the obstacle is positioned at least partially within the hazard area further includes determining a position of the object in the image data using the ultrasonic sensor data.

6. The vehicle control system of claim 1, wherein the instructions further cause the processing circuit to receive a signal to remotely start the agricultural vehicle, and wherein performing the action includes transmitting an image showing the obstacle positioned at least partially within the hazard area.

7. The vehicle control system of claim 1, wherein the instructions further cause the processing circuit to receive a signal to remotely start the agricultural vehicle, and wherein performing the action includes preventing the agricultural vehicle from starting.

8. A method for controlling an agricultural vehicle, comprising:

receiving (i) image data depicting at least a portion of a hazard area associated with the agricultural vehicle and (ii) ultrasonic sensor data from an ultrasonic sensor monitoring the hazard area, wherein the hazard area is dynamically updated based on a change in an implement operating mode of the agricultural vehicle;

determining, based on a combination of the image data and the ultrasonic sensor data, whether an obstacle is positioned at least partially within the hazard area; and performing an action with respect to the agricultural vehicle in response to a determination that the obstacle is positioned at least partially within the hazard area.

9. The method of claim 8, wherein determining whether the obstacle is positioned at least partially within the hazard area includes performing background subtraction using the image data and a background model.

10. The method of claim 9, wherein performing the background subtraction using the image data includes labeling one or more pixels of the image data as foreground pixels and one or more pixels of the image data as background pixels.

11. The method of claim 8, wherein determining whether the obstacle is positioned at least partially within the hazard area includes executing a machine learning model using the image data to identify an object in the image data.

12. The method of claim 11, wherein determining whether the obstacle is positioned at least partially within the hazard area further includes determining a position of the object in the image data using the ultrasonic sensor data.

13. The method of claim 8, further comprising receiving a signal to remotely start the agricultural vehicle, and wherein performing the action includes transmitting an image showing the obstacle positioned at least partially within the hazard area.

14. The method of claim 8, further comprising receiving a signal to remotely start the agricultural vehicle, and wherein performing the action includes preventing the agricultural vehicle from starting.

15. A non-transitory computer-readable storage medium having instructions stored thereon that, when executed by one or more processors, cause the one or more processors to:

receive (i) image data depicting at least a portion of a hazard area associated with an agricultural vehicle and (ii) ultrasonic sensor data from an ultrasonic sensor monitoring the hazard area, wherein the hazard area is dynamically updated based on a change in an implement operating mode of the agricultural vehicle;

determine, based on a combination of the image data and the ultrasonic sensor data, whether an obstacle is positioned at least partially within the hazard area; and perform an action with respect to the agricultural vehicle in response to a determination that the obstacle is positioned at least partially within the hazard area, wherein the action includes preventing the agricultural vehicle from starting.

16. The non-transitory computer-readable storage medium of claim 15, wherein determining whether the obstacle is positioned at least partially within the hazard area includes performing background subtraction using the image data and a background model.

17. The non-transitory computer-readable storage medium of claim 16, wherein performing the background subtraction using the image data includes labeling one or more pixels of the image data as foreground pixels and one or more pixels of the image data as background pixels.

18. The non-transitory computer-readable storage medium of claim 15, wherein determining whether the obstacle is positioned at least partially within the hazard area includes executing a machine learning model using the image data to identify an object in the image data.

19. The non-transitory computer-readable storage medium of claim 18, wherein determining whether the obstacle is positioned at least partially within the hazard area further includes determining a position of the object in the image data using the ultrasonic sensor data.

20. The non-transitory computer-readable storage medium of claim 15, wherein the instructions further cause the one or more processors to receive a signal to remotely start the agricultural vehicle, and wherein performing the action includes transmitting an image showing the obstacle positioned at least partially within the hazard area.

* * * * *